United States Patent
Inoue et al.

(10) Patent No.: US 12,307,800 B2
(45) Date of Patent: May 20, 2025

(54) INTER-WORD SCORE CALCULATION APPARATUS, QUESTION AND ANSWER EXTRACTION SYSTEM AND INTER-WORD SCORE CALCULATION METHOD

(71) Applicant: Hitachi, Ltd., Tokyo (JP)

(72) Inventors: Naoki Inoue, Tokyo (JP); Sota Sato, Tokyo (JP); Toru Shimotori, Tokyo (JP)

(73) Assignee: HITACHI, LTD., Tokyo (JP)

(*) Notice: Subject to any disclaimer, the term of this patent is extended or adjusted under 35 U.S.C. 154(b) by 616 days.

(21) Appl. No.: 17/683,582

(22) Filed: Mar. 1, 2022

(65) Prior Publication Data
US 2022/0366714 A1 Nov. 17, 2022

(30) Foreign Application Priority Data
May 13, 2021 (JP) .................... 2021-081498

(51) Int. Cl.
*G06V 30/416* (2022.01)
*G06F 18/22* (2023.01)
*G06V 30/19* (2022.01)

(52) U.S. Cl.
CPC ...... *G06V 30/416* (2022.01); *G06V 30/19113* (2022.01); *G06V 30/1918* (2022.01); *G06F 18/22* (2023.01)

(58) Field of Classification Search
CPC ........... G06V 30/416; G06V 30/19113; G06V 30/1918; G06F 18/26; G06F 18/22
See application file for complete search history.

(56) References Cited

U.S. PATENT DOCUMENTS

2022/0269703 A1* 8/2022 Gentilcore ........ G06F 16/24578

FOREIGN PATENT DOCUMENTS

| JP | 2007157006 A | * | 6/2007 |
| JP | 2013214239 A | * | 10/2013 |
| JP | 2015132899 A | * | 7/2015 |

* cited by examiner

*Primary Examiner* — Amandeep Saini
*Assistant Examiner* — Daniella M. DiGuglielmo
(74) *Attorney, Agent, or Firm* — Volpe Koenig

(57) ABSTRACT

An inter-word score calculation apparatus calculates a degree of relatedness between words included in an amount of data from at least one document. The inter-word score calculation apparatus includes a memory storing document data from the documents, term list data wherein predetermined terms are written and a processor. The processor performs a combination process of amplifying an amplification candidate word, which is a word corresponding to a term in the term list data and included in the document data, creating an amplified word, and adding the amplified word to the document data creating processed document data, calculate the degree of relatedness between words included in the processed document data using a predetermined calculation method, and when an amount of documents accumulated in the document data is smaller than a first predetermined amount, add the amplification candidate word to the processed document data.

12 Claims, 10 Drawing Sheets

FIG. 3

[RESPONSE HISTORY DOCUMENT]                310
   311                 312

| HISTORY ID | RESPONSE HISTORY |
|---|---|
| ID1 | I HAVE A QUESTION ... |
| ID2 | PLEASE TELL ME THE CAUSE OF ERROR ... |
| ... | |

FIG. 4

[TERM LIST DATA]                               330
        331                          332

| TERM | TYPE FLAG |
|---|---|
| HiRDB | WORD |
| pdls | WORD |
| [A-Z]{4}[0-9]{5}¥-[IWE] | REGULAR EXPRESSION |
| ... | |

FIG. 5

[IMPORTANT WORD AMPLIFICATION LIST]    340

| TERM 341 | TYPE FLAG 342 | NUMBER OF TERM-APPLICABLE DOCUMENTS (M) 343 | NUMBER OF TERM-APPLIED DOCUMENTS (E) 344 | TERM WEIGHTED NUMBER (T) 345 |
|---|---|---|---|---|
| - (OTHER) | - | 100 | 500 | 5 |
| pdls | TERM | 80 | 1000 | 3 |
| [A-Z]{4}[0-9]{5}¥-[IWE] | REGULAR EXPRESSION | 200 | ∞ | 2 |
| ... | | | | |

FIG. 6

[COMBINATION METHOD LIST DATA]  350

| COMBINATION METHOD | AMPLIFICATION REQUIRED OR NOT |
|---|---|
| SENTENCE UNIT | YES |
| DOCUMENT UNIT | NO |
| WHOLE | YES |

351 — COMBINATION METHOD
352 — AMPLIFICATION REQUIRED OR NOT

FIG. 7

[INTER-WORD SCORE DATA]  360

| FIRST WORD | SECOND WORD | SCORE |
|---|---|---|
| HiRDB | HiRDB | 20.00 |
| HiRDB | pdls | 10.00 |
| pdls | AAAA00000-I | 0.3 |
| ... | | |

361 — FIRST WORD
362 — SECOND WORD
363 — SCORE

FIG. 8

[GENERATED Q&A DATA]

| Q&A ID | HISTORY ID | Q | A |
|---|---|---|---|
| Q&A1 | ID1 | PLEASE TELL ME HOW TO START HiRDB | PLEASE USE THE pdstart COMMAND |
| Q&A2 | ID2 | WHAT IS THE CAUSE FOR ERROR CODE *? | THIS ERROR IS DEPENDENT ON THE COMMAND ARGUMENT ... |
| Q&A3 | ID2 | THE pdls COMMAND CAUSES AN ERROR | THE COMMAND LINE ARGUMENT IS WRONG ... |
| ... | | | |

[SELECTED Q&A DATA]

420

| SEARCH ID 421 | INPUT Q 422 | DISPLAYED Q&A ID 423 | SELECTION RESULT 424 |
|---|---|---|---|
| SEARCH 1 | START HiRDB | Q&A1 | Y |
| SEARCH 1 | START HiRDB | Q&A3 | N |
| SEARCH 2 | THE pdls COMMAND CAUSES AN ERROR ... | Q&A3 | Y |
| SEARCH 3 | - (DISPLAY) | Q&A2 | Y |
| ... | | | |

INTER-WORD SCORE CALCULATION APPARATUS, QUESTION AND ANSWER EXTRACTION SYSTEM AND INTER-WORD SCORE CALCULATION METHOD

BACKGROUND OF THE INVENTION

Field of the Invention

The present invention relates to an inter-word score calculation apparatus, a question & answer extraction system, and an inter-word score calculation method, and is suitably applicable to an inter-word score calculation apparatus, a question & answer extraction system and an inter-word score calculation method to calculate relationships between words necessary to automatically extract suitable combinations of questions & answers from a response history.

Description of the Related Art

In recent years, since the amount of data accumulated in relation to business or the like has been increasing, there is a growing need to pick up and present only portions required by humans from a large amount of data. As techniques used in such a data extraction field, techniques such as machine learning and statistical processing have become mainstream, and among such techniques, extraction of associations between words (keywords) is being researched as a basic technology.

Machine learning and statistical processing associate keywords on the premise of a large amount of data. For this reason, while data is being accumulated or when a field is fragmented, the amount of data is not large enough to allow for sufficient associations, resulting in a problem that it is not possible to make appropriate associations between keywords.

To solve such a problem, for example, Japanese Patent Laid-Open No. 2007-157006 discloses a technique for making associations between highly related keywords in a specific field by amplifying keywords (list of terms) related to input words.

However, in the case of the technique disclosed in Japanese Patent Laid-Open No. 2007-157006, it is necessary to prepare phrases in the corresponding field for each word (keyword), and an enormous amount of phrases has had to be prepared when handling many keywords over a plurality of fields. Furthermore, according to the technique disclosed in Japanese Patent Laid-Open No. 2007-157006, if the amount of inputted data increases compared to an initial state, there has been a problem that associations between keywords are more likely to be biased to the contents of a list of terms unless the list of terms is continuously maintained.

The present invention has been implemented by taking into account the above-described problems and it is an object of the present invention to propose an inter-word score calculation apparatus, a question & answer extraction system and an inter-word score calculation method that can appropriately calculate a degree of relatedness between words included in the corresponding data in accordance with a change in the amount of data accumulated and extract suitable related phrases.

SUMMARY OF THE INVENTION

In order to solve the above-described problems, the present invention provides an inter-word score calculation apparatus that calculates a degree of relatedness between words included in document data in which one or more documents are accumulated, the apparatus including a first data holding unit that accumulates and holds the document inputted from outside in the document data, a second data holding unit that holds term list data in which predetermined terms are written, a word combination unit that can perform a combination process of amplifying an amplification candidate word, which is a word corresponding to a term written in the term list data and included in the document constituting the document data and adding the amplified word to the document data and an inter-word score calculation unit that calculates a degree of relatedness between words included in the document data using the document data processed by the word combination unit using a predetermined calculation method, wherein when an amount of documents accumulated in the document data is smaller than a first predetermined amount, the word combination unit adds the amplification candidate word to the document data.

In order to solve the above-described problems, the present invention provides a question & answer extraction system that extracts a combination of a question sentence and an answer sentence from document data in which one or more documents are accumulated, the system including an inter-word score calculation apparatus that calculates a degree of relatedness between words included in the document data and a Q&A extraction apparatus that extracts a combination of a question sentence and an answer sentence, which is a combination of words with the high degree of relatedness from the document included in the document data using the degree of relatedness calculated by the inter-word score calculation apparatus, wherein the inter-word score calculation apparatus includes a first data holding unit that accumulates and holds the document including the question sentence and the answer sentence in the document data, a second data holding unit that holds term list data in which predetermined terms are written, a word combination unit that can perform a combination process of amplifying an amplification candidate word, which is a word corresponding to a term written in the term list data and included in the document constituting the document data and adding the amplified word to the document data and an inter-word score calculation unit that calculates a degree of relatedness between words included in the document data using the document data processed by the word combination unit using a predetermined calculation method, and when an amount of documents accumulated in the document data is smaller than a first predetermined amount, the word combination unit adds the amplification candidate word to the document data.

In order to solve the above-described problems, the present invention provides an inter-word score calculation method using an inter-word score calculation apparatus that calculates a degree of relatedness between words included in document data in which one or more documents are accumulated, the inter-word score calculation apparatus holding term list data in which predetermined terms are written, and the method including a data holding step in which the inter-word score calculation apparatus accumulates and holds the document inputted from outside in the document data, a word combination step in which the inter-word score calculation apparatus can amplify an amplification candidate word, which is a word corresponding to a term written in the term list data and included in the document constituting the document data and add the amplified word to the document data, and an inter-word score calculation step in which the inter-word score calculation apparatus calculates a degree of relatedness between words included in the document data using the document data processed in the word combination step using a predetermined calculation method, wherein when an amount of documents accumulated in the document data is smaller than a first predetermined amount, the inter-word score calculation apparatus adds the amplification candidate word to the document data in the word combination step.

According to the present invention, it is possible to appropriately calculate the degree of relatedness between words included in data in accordance with a change in the amount of data accumulated and extract suitable related phrases.

BRIEF DESCRIPTION OF THE DRAWINGS

FIG. 3 is a diagram illustrating a specific example of a response history document 310;

FIG. 4 is a diagram illustrating a specific example of term list data 330;

FIG. 5 is a diagram illustrating a specific example of an important word amplification list 340;

FIG. 6 is a diagram illustrating a specific example of combination method list data 350;

FIG. 7 is a diagram illustrating a specific example of inter-word score data 360;

FIG. 8 is a diagram illustrating a specific example of generated Q&A data 410;

FIG. 9 is a diagram illustrating a specific example of selected Q&A data 420;

DETAILED DESCRIPTION OF THE PREFERRED EMBODIMENT

Hereinafter, an embodiment of the present invention will be described in detail with reference to the accompanying drawings.

(1) System Configuration

Figure 1:
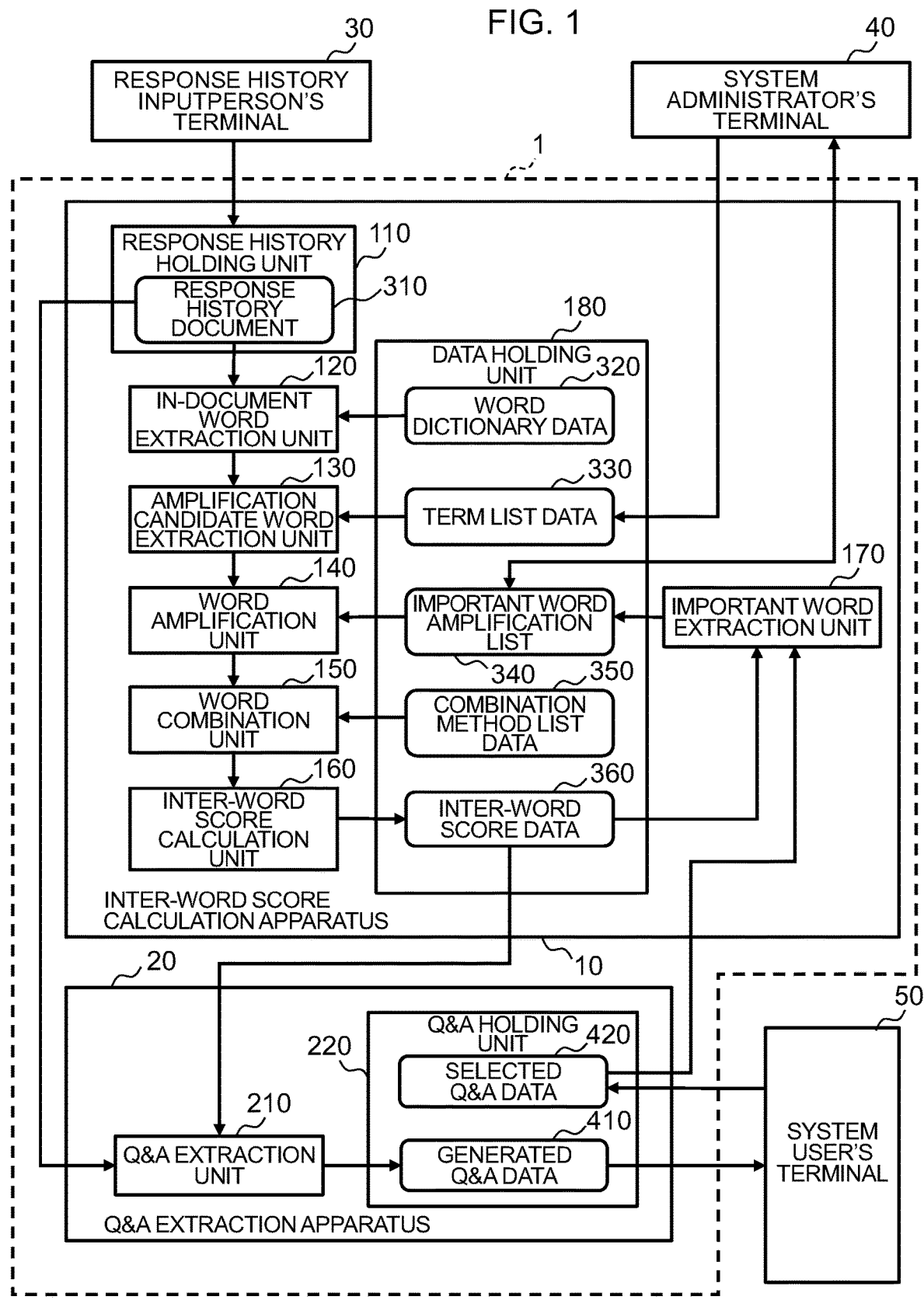
FIG. 1 is a block diagram illustrating a configuration example of a question & answer extraction system 1 according to an embodiment of the present invention.

FIG. 1 is a block diagram illustrating a configuration example of a question & answer extraction system 1 according to an embodiment of the present invention. A question & answer extraction system 1 is a system that automatically extracts appropriate combinations of questions & answers from a response history, and is constructed of an inter-word score calculation apparatus 10 and a Q&A extraction apparatus 20, which are communicably coupled. As shown in FIG. 1, the inter-word score calculation apparatus 10 is also communicably coupled to a response history input person's terminal 30 and a system administrator's terminal 40 in addition to the Q&A extraction apparatus 20. The Q&A extraction apparatus 20 is also communicably coupled to a system user's terminal 50 in addition to the inter-word score calculation apparatus 10.

(1-1) Inter-Word Score Calculation Apparatus 10

The inter-word score calculation apparatus 10 is an apparatus that calculates a degree of relatedness (inter-word score) of a combination of words in a document by decomposing a response history document 310 in which past response histories are recorded. Although details will be described later, it is one of features of the inter-word score calculation apparatus 10 according to the present embodiment that a degree of influence of a list of terms of related phrases (term list data 330) given from a system administrator in calculating an inter-word score is changed in accordance with a change in a document amount (data amount) of the response history documents 310 to be accumulated.

As shown in FIG. 1, the inter-word score calculation apparatus 10 is constructed of a response history holding unit 110, an in-document word extraction unit 120, an amplification candidate word extraction unit 130, a word amplification unit 140, a word combination unit 150, an inter-word score calculation unit 160, an important word extraction unit 170 and a data holding unit 180. The response history holding unit 110 holds the response history document 310, and the data holding unit 180 holds word dictionary data 320, term list data 330, an important word amplification list 340, combination method list data 350 and inter-word score data 360.

The response history holding unit 110 accumulates and holds response records (response histories) inputted from the response history input person's terminal 30 in text form, in the response history document 310. Input timing of the response history from the response history input person's terminal 30 is not particularly limited, a first response history may be inputted at any timing, and further, a response history may be added at any timing.

The response history document 310 is information that accumulates one or more document data using a text form response record including a question sentence (Q) received by a person in charge of response and an answer sentence (A) thereof as one document. Note that the present embodiment assumes not only a simplest case where one question sentence (Q) and one answer sentence (A) exist in one response record (one document), but also a case where two or more As exist for one Q and a case where one or more As exist for two or more Qs. The response history document 310 is not only referenced by the in-document word extraction unit 120 but also supplied to the Q&A extraction unit 210 of the Q&A extraction apparatus 20. A specific data configuration of the response history document 310 will be described later with reference to FIG. 3.

Note that since the inter-word score calculation apparatus 10 is coupled to the Q&A extraction apparatus 20 in the present embodiment, one document of the response record accumulated in the response history document 310 becomes a document with at least two or more sentences including a question sentence and an answer sentence, but in a case where the inter-word score calculation apparatus 10 is used for other purposes, one document may be constructed of one or more sentences.

The in-document word extraction unit 120 has a function of extracting the response history document 310 from the response history holding unit 110 and extracting words included in the extracted document and registered in the word dictionary data 320. When an example of a more detailed process in the above-described function is shown, the in-document word extraction unit 120 extracts a document of the response history (response history 312) recorded in the response history document 310, labels the extracted document and divides the document into sentence units. The in-document word extraction unit 120 extracts a combination of related sentences (Q&A candidate sentences) from the above-described document divided into sentence units. Furthermore, the in-document word extraction unit 120 searches for each sentence that constitutes the extracted Q&A candidate sentence using the word dictionary data 320 and extracts corresponding words for each sentence that constitutes the Q&A candidate sentence. The words extracted by the in-document word extraction unit 120 is listed together, for example, in sentence units and inputted to the amplification candidate word extraction unit 130.

Though not shown, the word dictionary data 320 is dictionary data storing information (e.g., parser dictionary) necessary for word separation of a language (e.g., Japanese) and is assumed to have been set in advance by the system administrator et. al. For example, a MeCab dictionary can be used for the word dictionary data 320.

The amplification candidate word extraction unit 130 has a function of comparing words included in the list inputted from the in-document word extraction unit 120 using the term list data 330 and determining words that match the term written in the term list data 330 as a candidate for the word (amplification candidate word) to be amplified by the word amplification unit 140. Though details will be described later, it is one of features of the inter-word score calculation apparatus 10 according to the present embodiment that in order to adjust inter-word related weighting in accordance with a change in the amount of accumulated data (the number of documents of the response history document 310), the inter-word score calculation apparatus 10 can amplify and add words highly related to a sentence that constitutes a Q&A candidate sentence.

The term list data 330 is data with one or more terms listed which is assumed to relate to the field of response records recorded in the response history document 310 and any data can be used. More specifically, for example, a glossary or indexes of a manual may be used or a list of command names may be used or words selected appropriately by the system administrator et. al from the information and converted into a database may be used. Note that the term list data 330 need not be description of relevance of a dictionary or words as the important word amplification list 340, which will be described later or it is sufficient to simply be able to distinguish between words that may exist in the response history document 310.

A method for registering terms in the term list data 330 is not limited to registering "words" themselves, but terms can be registered in notation using a predetermined "rule" represented by a regular expression. Information (e.g., flag) to identify a type of "word" or "rule" is registered for each term registered in the term list data 330 and a detailed type of "rule" may also be registered. A specific data configuration of the term list data 330 will be described later with reference to FIG. 4.

The word amplification unit 140 has a function of calculating an amplification count (amplification count calculation process) for each amplification candidate word extracted by the amplification candidate word extraction unit 130 based on the important word amplification list 340 and creating an amplification list obtained by amplifying the amplification candidate word by the calculated amplification count.

The important word amplification list 340 is information indicating a setting relating to amplification of the term for each term registered in the term list data 330. The important word amplification list 340 is set by, for example, the system administrator and can be changed as appropriate. A specific data configuration of the important word amplification list 340 will be described later with reference to FIG. 5.

The word combination unit 150 has a function of combining the amplification list created by the word amplification unit 140 into a response history document (more exactly, each sentence, each document or a whole document included in the response history document) according to a combination method specified in the combination method list data 350.

The combination method list data 350 is data in which a setting relating to the combination by the word combination unit 150 is specified. The combination method specified by the combination method list data 350 is determined according to an inter-word score calculation method by the inter-word score calculation unit 160. A specific data configuration of the combination method list data 350 will be described later with reference to FIG. 6.

The inter-word score calculation unit 160 has a function of creating a combination of words included in each document of the response history document using the response history document after terms are combined by the word combination unit 150 and calculating an inter-word score indicating a degree of relatedness between words for each combination using a predetermined calculation method. A known calculation method such as Word2Vec or a statistical technique can be used for the inter-word score calculation method, and so detailed description will be omitted. The inter-word score calculated by the inter-word score calculation unit 160 is sent to the data holding unit 180 and recorded in the inter-word score data 360.

The inter-word score data 360 is data holding the inter-word score calculated by the inter-word score calculation unit 160. A specific data configuration of the inter-word score data 360 will be described later with reference to FIG. 7.

The important word extraction unit 170 has a function of extracting words existing in Q&As easily selected as important words based on a combination of words included in the selected Q&A data 420 held by the Q&A holding unit 220 of the Q&A extraction apparatus 20 and words written in the inter-word score data 360 held by the data holding unit 180. The important word extraction unit 170 can list the extracted important words, add the important words to the important word amplification list 340 and thereby register the words existing in easily selectable Q&As as amplification candidate terms in calculation of the inter-word score executed hereinafter.

(1-2) Q&A Extraction Apparatus 20

The Q&A extraction apparatus 20 is an apparatus that generates suitable Q&A (combination of a question and a response) from the Q&A response history using the inter-word score calculation result by the inter-word score calculation apparatus 10 and holds this as the generated Q&A data 410. When a system user performs a Q&A search operation using the system user's terminal 50, the Q&A extraction apparatus 20 supplies Q&A corresponding to a search condition to the system user's terminal 50 out of the held generated Q&A data 410. The system user inputs questions (Q) as the search condition in the Q&A search operation. Furthermore, the Q&A extraction apparatus 20 also has a function of holding Q&A selection results used (selected) by the system user out of the Q&As supplied to the system user's terminal 50 as the selected Q&A data 420 and supplying the Q&A selection results to extract important words in the inter-word score calculation apparatus 10.

The Q&A extraction apparatus 20 is constructed of a Q&A extraction unit 210 and a Q&A holding unit 220, and the Q&A holding unit 220 holds generated Q&A data 410 and selected Q&A data 420.

The Q&A extraction unit 210 generates suitable Q&As by extracting Q&A including word combinations having a high degree of relatedness (inter-word score) from among a plurality of question sentences (Q) and answer sentences (A) included in the response history document 310 using the response history document 310 held in the response history holding unit 110 of the inter-word score calculation apparatus 10 and the inter-word score data 360 held in the data holding unit 180. Note that the Q&A extracted by the Q&A extraction unit 210 may be a set of Q&A having a highest inter-word score or Q&A of a predetermined number of sets from the top inter-word score. Considering the appearance frequency of a word in which the top inter-word score is calculated, a suitable Q&A combination may be extracted. The Q&A extraction unit 210 adds the generated suitable Q&A to the generated Q&A data 410 held in the Q&A holding unit 220.

As described above, the generated Q&A data 410 is data indicating the Q&A generated by the Q&A extraction unit 210, and when a search request is received from the system user's terminal 50, Q&A corresponding to the search condition is supplied out of the generated Q&A data 410. FIG. 8, which will be described later, illustrates a specific example of the generated Q&A data 410.

The selected Q&A data 420 is data indicating the selection result of Q&A used (selected) by the system user (system user's terminal 50), is supplied to the important word extraction unit 170 of the inter-word score calculation apparatus 10 and used to extract important words. FIG. 9, which will be described later, illustrates a specific example of the selected Q&A data 420.

(1-3) Response History Input Person's Terminal 30

The response history input person's terminal 30 is a terminal used by a response history input person and has a function of inputting a response history of questions & answers to the inter-word score calculation apparatus 10 in text form. The response history inputted from the response history input person's terminal 30 to the inter-word score calculation apparatus 10 is accumulated in the response history holding unit 110 as the response history document 310.

Note that a specific method whereby the response history input person's terminal 30 inputs the response history in text form is not particularly limited. For example, the response history input person may input response records of questions & answers in text form by operating an input apparatus such as a keyboard or convert speech data of a response record to text and input the text using an existing speech text conversion apparatus that converts speech to text.

Note that the present embodiment assumes that a response history is inputted from the response history input person's terminal 30 on a regular or irregular basis using implemented response records. Therefore, the number of documents included in the response history document 310 held in the response history holding unit 110 increases with time.

(1-4) System Administrator's Terminal 40

The system administrator's terminal 40 is a terminal used by the system administrator of the question & answer extraction system and has a function of receiving an operation by the system administrator and managing the term list data 330 and the important word amplification list 340 held in the data holding unit 180 of the inter-word score calculation apparatus 10 according to the operation. Specific data items managed by the system administrator (system administrator's terminal 40) will be described later in descriptions of FIG. 4 and FIG. 5.

Note that when the important word amplification list 340 is changed in actual operation, the system administrator checks to what extent the Q&As included in the generated Q&A data 410 cover or change the Q&As included in the selected Q&A data 420 after the processing by the inter-word score calculation apparatus 10, which will be described later in FIG. 10, runs through and Q&As are generated by the Q&A extraction unit 210 of the Q&A extraction apparatus 20, and performs maintenance on the important word amplification list 340 based on the check result. Specific maintenance may change an amplification factor ("term weighted number (T)," which will be described later) of a word for each term, the number of documents for which total amplification of a word starts ("the number of term-applicable documents (M)," which will be described later) or the number of documents for which amplification of a word ends ("the number of term-applied documents (E)," which will be described later).

(1-5) System User's Terminal 50

The system user's terminal 50 is a terminal used by the system user to make a Q&A search request or notification of the Q&A selection result to the Q&A extraction apparatus 20.

The system user is a user who uses a service of supplying suitable Q&As by the question & answer extraction system 1 (especially the Q&A extraction apparatus 20) and operates the system user's terminal 50. By performing a search operation using the system user's terminal 50, the system user can make a search for Q&As under a desired condition out of Q&As (generated Q&A data 410) generated by the Q&A extraction unit 210 of the Q&A extraction apparatus 20. Q&A corresponding to the search condition is supplied to the system user's terminal 50, and the system user can thereby browse Q&As of the search result. Furthermore, when actually using one of Q&As out of the displayed search results, the system user performs a Q&A selection operation. The Q&As used (selected) by the system user are fed back to the Q&A extraction apparatus 20 and held in the Q&A holding unit 220 as the selected Q&A data 420.

(1-6) Hardware Configuration

Figure 2:
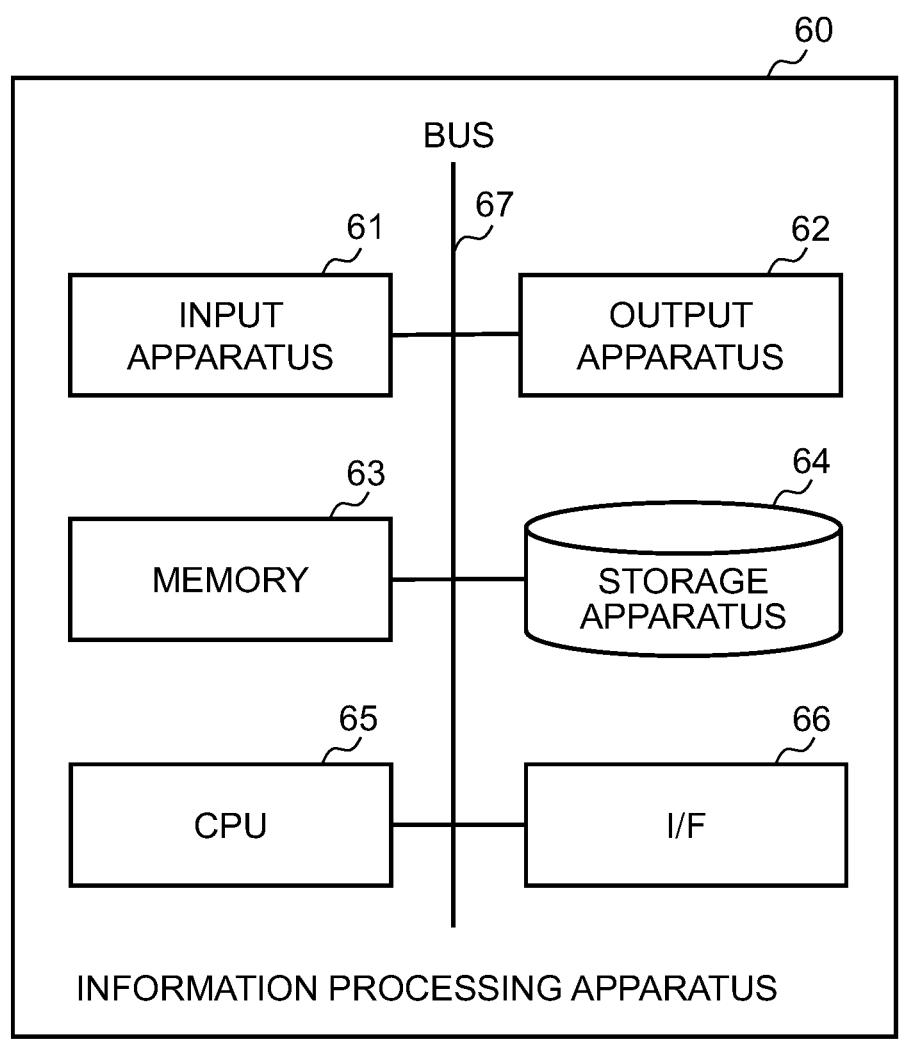
FIG. 2 is a block diagram illustrating a hardware configuration example of an inter-word score calculation apparatus 10 and a Q&A extraction apparatus 20.

FIG. 2 is a block diagram illustrating a hardware configuration example of the inter-word score calculation apparatus 10 and the Q&A extraction apparatus 20. The inter-word score calculation apparatus 10 and the Q&A extraction apparatus 20 can be implemented by an information processing apparatus 60 having, for example, the hardware configuration shown in FIG. 2. The information processing apparatus 60 shown in FIG. 2 is a common information processing apparatus and is constructed of an input apparatus 61, an output apparatus 62, a memory 63, a storage apparatus 64, a CPU 65, and an I/F 66 coupled to each other via a bus 67.

The input apparatus 61 is an apparatus that receives input by an operator and is, for example, a keyboard, a mouse or a touch panel. The output apparatus 62 is an apparatus that outputs a result of processing executed by the CPU 65 or data held in the memory 63, the storage apparatus 64 or the like and is, for example, a display or a printer. The I/F 66 is various interfaces such as a communication interface and an input/output interface. The bus 67 is an internal communication line, and couples the respective apparatuses in the information processing apparatus 60 and exchanges information among these apparatuses.

The memory 63 is mainly a main storage apparatus such as a RAM (random access memory) and used by the CPU 65 to execute a program. The storage apparatus 64 is a non-transitory auxiliary storage apparatus such as a HDD (hard disk drive) or an SSD (solid state drive) and stores the above-described program and data or the like referenced to execute the program. For example, when the information processing apparatus 60 is the inter-word score calculation apparatus 10, the response history holding unit 110 and the data holding unit 180 can be implemented by the storage apparatus 64 of the information processing apparatus 60. Similarly, when the information processing apparatus 60 is the Q&A extraction apparatus 20, the Q&A holding unit 220 can be implemented by the storage apparatus 64 of the information processing apparatus 60.

The CPU 65 is an example of a processor that performs arithmetic processing, which is, for example, a CPU (central processing unit). In the information processing apparatus 60, the CPU 65 executes a program stored in the storage apparatus 64 using the memory 63, and thereby implements predetermined functions provided for the apparatus (more specifically, corresponding to various functional units other than the response history holding unit 110 and the data holding unit 180 provided for the inter-word score calculation apparatus 10 shown in FIG. 1 and the Q&A extraction unit 210 of the Q&A extraction apparatus 20). Note that part of or all of the program executed by the CPU 65 of the information processing apparatus 60 or referenced data may be stored in advance in the storage apparatus 64 or may be configured so as to be stored in the storage apparatus 64 of the information processing apparatus 60 from a non-transitory storage apparatus of another apparatus coupled via a network through the I/F 66 or from a non-transitory storage medium, as necessary.

Note that the response history input person's terminal 30, the system administrator's terminal 40 and the system user's terminal 50 shown in FIG. 1 can also be implemented by a computer provided with a hardware configuration similar to the hardware configuration of the information processing apparatus 60 shown in FIG. 2.

(2) Data Configuration

FIG. 3 is a diagram illustrating a specific example of the response history document 310. The response history document 310 is information that accumulates and holds past response records including Q&As. In the case of FIG. 3, the response history document 310 includes items such as a history ID 311 and a response history 312.

The history ID 311 is an identifier to uniquely identify a response history (Q&A) for each set. In the response history 312, the contents of a response record are recorded in a text format document. The document recorded in the response history 312 is generally constructed of two or more sentences, and more specifically, it includes one or more sentences including a question (Q) and one or more sentences including one or more answers (A).

Note that in the following description, while a more exact expression such as "document recorded in the response history 312 of the response history document 310" should be used, a broader expression such as "the response history document 310" may be used or a simple expression such as "the input document" may be used for simplicity. Furthermore, unless otherwise noted, "the number of documents increases" means that the number of documents (the number of records) of a response record registered in the response history document 310 increases.

FIG. 4 is a diagram illustrating a specific example of the term list data 330. The term list data 330 is data in which terms associated with the field of response records recorded in the response history document 310 are listed. In the case of FIG. 4, the term list data 330 includes items such as a term 331 and a type flag 332.

The term 331 is a word that represents a term or a rule that represents a term. A typical rule that represents a term is a regular expression. The type flag 332 is a code that indicates the type of the term 331. More specifically, the type flag 332 may be a code that indicates either a "word" or a "rule" and the "rule" may be a code that also indicates the type thereof (e.g., "regular expression").

FIG. 5 is a diagram illustrating a specific example of the important word amplification list 340. The important word amplification list 340 is information indicating a setting relating to amplification of the term for each term (may be not only a word but also a rule) registered in the term list data 330. Note that the important word amplification list 340 can also have a value corresponding to a term not set individually (e.g., "—(other)" in FIG. 5) as information. In the case of FIG. 5, the important word amplification list 340 includes items such as a term 341, a type flag 342, the number of term-applicable documents 343, the number of term-applied documents 344 and a term weighted number 345.

The term 341 is a word that represents a term or a rule that represents a term, and corresponds to the term 331 of the term list data 330. The type flag 342 is a code that indicates the type of the term 341, and corresponds to the type flag 332 of the term list data 330.

The number of term-applicable documents 343 indicates the number of inputted documents for which full application of term amplification starts and the number of documents is denoted by "M" in the following description.

The number of term-applied documents 344 indicates the number of inputted documents that is a condition for ending amplification of the term, and the number of documents thereof is denoted by "E" in the following description. Note that when the condition for ending amplification of the term is not specified, "∞ (infinity)" is set in the number of term-applied documents 344 as indicated in the third record from the top of FIG. 5.

The term weighted number 345 indicates a basic amplification count of a term (may also be an amplification factor), and the amplification count is denoted by "T" in the following description. The term weighted number 345 is set as an amplification count applicable to each document. Note that although the term weighted number 345 is specified by an amplification count in the present description, the term weighted number 345 may be specified by an amplification factor instead of the amplification count, as another example.

FIG. 6 is a diagram illustrating a specific example of the combination method list data 350. The combination method list data 350 is data indicating a setting relating to a word combination in which amplified terms (words) are combined into an input document or the like. In the case of FIG. 6, the combination method list data 350 includes items such as a combination method 351 and amplification required or not 352.

The combination method 351 is information that indicates a method for combining amplified words (amplification list) and specifies the destination to which the amplification list is added. More specifically, the "sentence unit" means that the in-document word extraction unit 120 adds the amplification list to the Q&A candidate sentence from which words are extracted, the "document unit" means that the amplification list is added to one document in the response history document 310 including the Q&A candidate sentence, and the "whole document" means that the amplification list is added to the whole document of the response history document 310.

The amplification required or not 352 indicates whether or not amplification using the combination method specified in the combination method 351 is required. Note that a plurality of combination methods may be simultaneously applied as shown in FIG. 6 in which the "sentence unit" and the "whole document" of the amplification required or not 352 are both set to "YES."

FIG. 7 is a diagram illustrating a specific example of the inter-word score data 360. The inter-word score data 360 is data in which an inter-word score calculated by the inter-word score calculation unit 160 is held. In the case of FIG. 7, the inter-word score data 360 includes items such as a first word 361, a second word 362 and a score 363.

The first word 361 and the second word 362 indicate a combination of words for which an inter-word score is calculated. The score 363 is a calculated inter-word score and means that the greater the numerical value, the stronger the relationship between the first word 361 and the second word 362. As described above, since the inter-word score is calculated using a known calculation method such as Word2Vec or a statistical technique, the values written in the score 363 are values dependent on the calculation method.

FIG. 8 is a diagram illustrating a specific example of the generated Q&A data 410. The generated Q&A data 410 is data in which Q&As generated by the Q&A extraction unit 210 based on the inter-word score calculated by the inter-word score calculation apparatus 10 are recorded. In the case of FIG. 8, the generated Q&A data 410 includes items such as a Q&A ID 411, a history ID 412, a Q 413 and an A 414.

The Q&A ID 411 is an identifier to uniquely identify a Q&A generated by the Q&A extraction unit 210 and an identifier uniquely assigned for each generated Q&A is written. The history ID 412 is an identifier of a response history to identify from which response history a Q&A is generated. The identifier of the response history written in the history ID 412 corresponds to the history ID 311 of the response history document 310.

A sentence corresponding to a question (Q) out of generated Q&As is written in the Q 413 in text form. A sentence corresponding to a response (A) out of the generated Q&As is written in A 414 in text form.

Note that in FIG. 8, there may be a case where a plurality of Q&As (Q413, A414) are generated from one history ID 412="ID2" as an example shown in records of Q&A ID 411="2," "3."

FIG. 9 is a diagram illustrating a specific example of the selected Q&A data 420. The selected Q&A data 420 is data in which the selection result of Q&A used (selected) by the system user out of the Q&As supplied from the generated Q&A data 410 in response to a Q&A search request from the system user's terminal 50 is recorded. In the case of FIG. 9, the selected Q&A data 420 includes items such as a search ID 421, an input Q 422, a displayed Q&A ID 423, and a selection result 424.

The search ID 421 is an identifier to uniquely identify a Q&A search request and a unique identifier is assigned to each Q&A search request requested from the system user's terminal 50. A question (Q) inputted as a search condition in the Q&A search request is recorded in the input Q 422. The displayed Q&A ID 423 is an identifier of a Q&A supplied (displayed) to the system user's terminal 50 by matching the search condition of the Q&A. The identifier used for the displayed Q&A ID 423 corresponds to the identifier of the Q&A ID 411 in the generated Q&A data 410.

The selection result 424 is information indicating whether or not the Q&A displayed in response to the Q&A search request (that is, Q&A identified by the displayed Q&A ID 423) is selected by the system user. "Y" meaning that the request is selected or "N" meaning that the request is not selected is written in the selection result 424.

Note that regarding the display for the Q&A search request, a plurality of Q&As (displayed Q&A ID 423="Q&A 1," "Q&A 3") can be displayed from one input Q 422 (search ID 421="search 1") as in the first and second records in FIG. 9. Furthermore, input Q 422="—(display)" is shown in the fourth record in FIG. 9, and this means that no question is inputted for the Q&A search request. In this case, the Q&A extraction apparatus 20 may display Q&As having a high frequency of use out of Q&As held in the generated Q&A data 410.

(3) Processing

Figure 10:
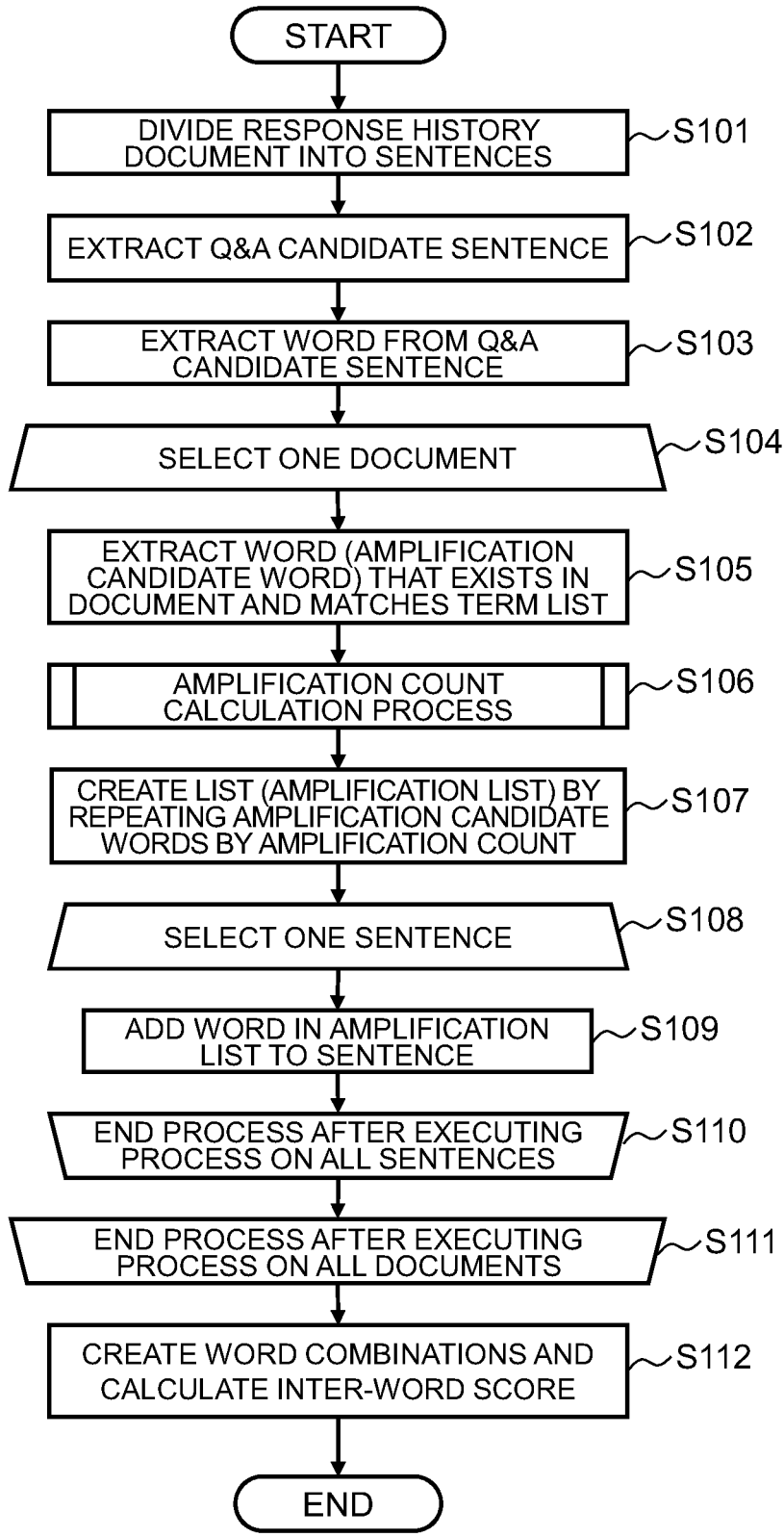
FIG. 10 is a flowchart illustrating a processing procedure example of an inter-word score calculation process.

FIG. 10 is a flowchart illustrating an example of a processing procedure of an inter-word score calculation process. The inter-word score calculation process is a process for the inter-word score calculation apparatus 10 to calculate an inter-word score and the process is not only executable periodically but various timings can be adopted separately as execution opportunities. Examples of specific execution opportunities may include when the response history document 310 is updated by input of a response history from the response history input person's terminal 30, when a calculation of an inter-word score is requested from the system administrator's terminal 40, and when a Q&A search request is made from the system user's terminal 50 to the Q&A extraction apparatus 20.

According to FIG. 10, the in-document word extraction unit 120 first extracts a document of a response history recorded in the response history document 310 with reference to the response history holding unit 110, labels the extracted document and divides the document into sentence units (step S101).

Next, the in-document word extraction unit 120 extracts a combination of related sentences (Q&A candidate sentences) from documents of the response history divided into sentence unit in step S101 (step S102).

Next, for each sentence constituting the Q&A candidate sentence extracted in step S102, the in-document word extraction unit 120 searches for the words written in the word dictionary data 320 using the word dictionary data 320 and extracts the corresponding words (step S103). The words extracted in step S103 are listed, for example, in sentence units.

Next, the inter-word score calculation apparatus 10 selects each document included in the response history document 310 one by one, and repeats processes in steps S105 to S110, which will be described later (step S104). Documents to be processed are selected, for example, by an overall control unit (not shown).

In step S105, the amplification candidate word extraction unit 130 compares the document selected in step S104 with the words included in the list inputted from the in-document word extraction unit 120 in step S103 using the term list data 330, and extracts words matching the terms written in the term list data 330 as candidates of the words to be amplified by the word amplification unit 140 (amplification candidate words).

Next, the word amplification unit 140 performs an amplification count calculation process of calculating an amplification count based on the important word amplification list 340 for each word (term) of the amplification candidate words extracted in step S105 (step S106). Details of the amplification count calculation process will be described later with reference to FIG. 11.

Next, the word amplification unit 140 creates an amplification list by repeatedly amplifying the amplification candidate words by the amplification count calculated in step S106 (step S107). Note that when a plurality of words are extracted as the amplification candidate words in step S105, the amplification count calculation process in step S106 calculates an amplification count for each word included in the amplification candidate words. Therefore, in this case, when the amplification list is created in step S107, the amplification list is created according to an individual amplification count for each word included in the amplification candidate words.

Next, the word combination unit 150 combines the amplification list created by the word amplification unit 140 with the response history document 310 (more specifically, each sentence, each document or a whole document included in the response history document 310) according to the setting (the combination method 351 and the amplification required or not 352) specified in the combination method list data 350 (steps S108 to S110).

Note that steps S108 to S110 in FIG. 10 show an example of the processing procedure when the combination method 351 is specified as the "sentence unit" in the combination method list data 350. More specifically, the word combination unit 150 selects one sentence from the document selected in step S104 in this case (step S108), adds the contents (amplification candidate word amplified by an amplification count) of the amplification list created in step S107 to the selected sentence (step S109), and repeats these processes for all sentences included in the document selected in step S104 (step S110).

On the other hand, when the combination method 351 in the combination method list data 350 is specified as the "document unit," the word combination unit 150 may add a line of words (amplification candidate words amplified by an amplification count) written in the amplification list to the document (one document in the response history document 310) selected in step S104 instead of the above-described processes in steps S108 to S110. Furthermore, when the combination method 351 is specified as "whole" in the combination method list data 350, the word combination unit 150 may add a document composed of the words (amplification candidate words amplified by an amplification count) written in the amplification list to the response history document 310 instead of the above-described processes in steps S108 to S110.

In either case of the above-described combination method 351, the response history document 310 held in the response history holding unit 110 may be updated with the sentence, document or whole document after the combination.

When step S110 ends, the inter-word score calculation apparatus 10 (e.g., an overall control unit (not shown)) checks whether or not the processes in steps S105 to S110 have been executed on all the documents included in the response history document in which Q&A candidate sentences are extracted in step S102 (step S111), and proceeds to step S112 when it determines that the processes in steps S105 to S110 have been executed.

In step S112, the inter-word score calculation unit 160 creates a combination of words from a document group (that is, response history document after the processes in steps S101 to S111) including the words (amplification candidate words amplified by an amplification count) combined in steps S108-S110 by the word combination unit 150 and calculates an inter-word score indicating the degree of relatedness between words using a default calculation method for each combination. The inter-word score calculation unit 160 then updates the inter-word score data 360 according to the calculation result in step S112. When the above-described processes are completed, the inter-word score calculation process ends.

Figure 11:
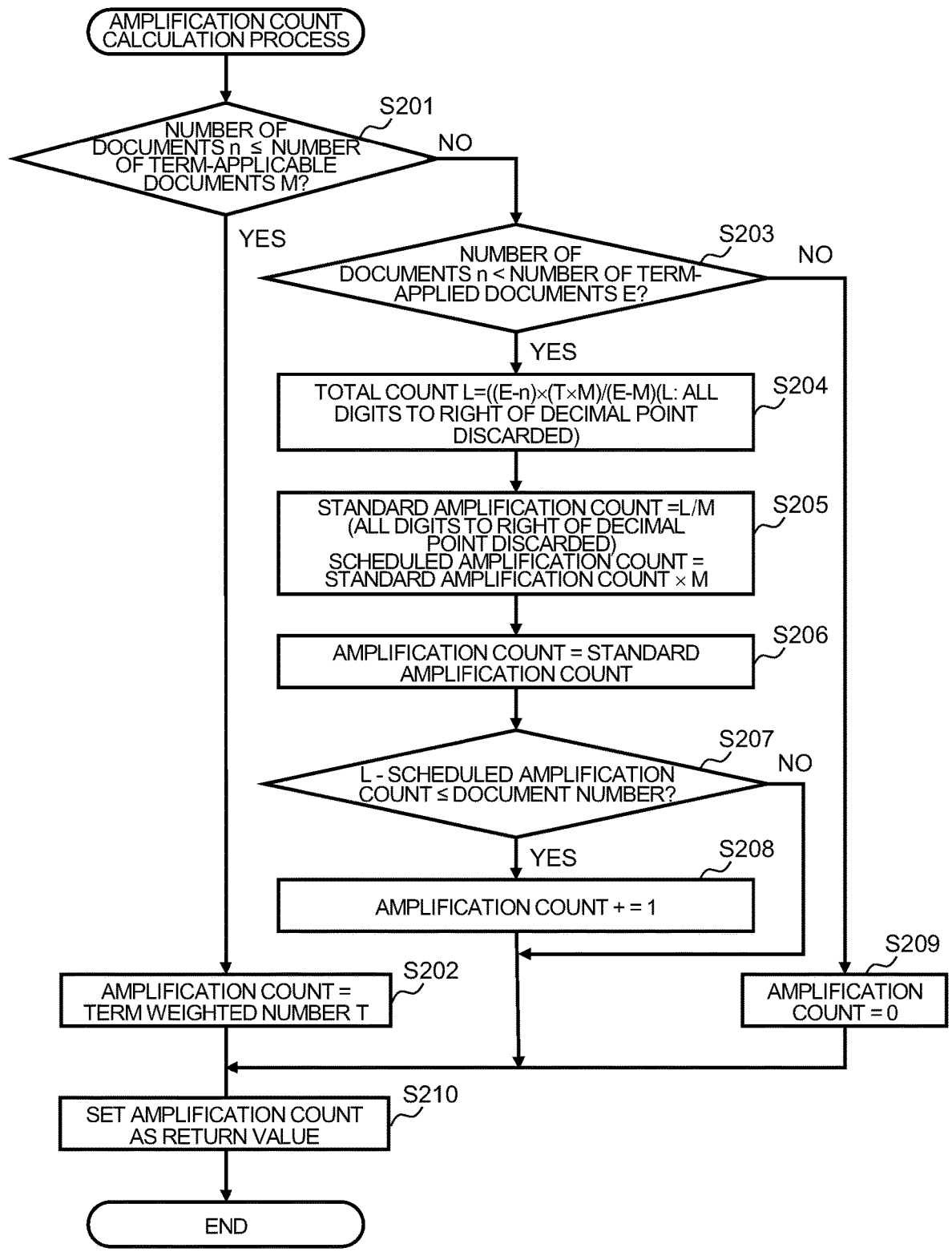
FIG. 11 is a flowchart illustrating a processing procedure example of an amplification count calculation process.

FIG. 11 is a flowchart illustrating an example of a processing procedure of an amplification count calculation process. As described above, the amplification count calculation process shown in FIG. 11 corresponds to the process in step S106 in FIG. 10.

Note that although a plurality of terms (may be words or rules) can be extracted as the amplification candidate words in step S105, when a setting relating to amplification is different in each term in the important word amplification list 340 (different in at least one set value of the number of term-applicable documents 343, the number of term-applied documents 344 and the term weighted number 345), the word amplification unit 140 repeatedly executes the processes in FIG. 11 for each term described above. On the other hand, when the setting relating to amplification in the important word amplification list 340 is common to the plurality of terms (may be words or rules) included in the amplification candidate words, the word amplification unit 140 may execute the process in FIG. 11 once.

According to FIG. 11, the word amplification unit 140 first compares the number of documents (n) recorded in the response history document 310 with a value (M) of the number of term-applicable documents 343 specified in the important word amplification list 340 for the target term in the amplification candidate words (hereinafter, referred to as a "target term") and determines whether or not "n≤M" (step S201). Note that the number of documents "n" is not a predetermined value, but a value to be determined according to input of the response history corresponding to the response history holding unit 110.

When "n≤M" in step S201 (YES in step S201), the word amplification unit 140 sets a value (T) of the term weighted number 345 specified in the important word amplification list 340 for the target term in the "amplification count" of the target term (step S202) and proceeds to step S210, which will be described later.

If "n>M" in step S201 (NO in step S201), the flow proceeds to step S203. In step S203, the word amplification unit 140 compares the number of documents (n) with the value (E) of the number of term-applied documents 344 specified in the important word amplification list 340 for the target term and determines whether or not "n<E". If "n<E" in step S203 (YES in step S203), the flow proceeds to step S204. On the other hand, if "n≥E" in step S203 (NO in step S203), the word amplification unit 140 sets "0" in the "amplification count" of the target term (step S209) and proceeds to step S210, which will be described later.

In step S204, the word amplification unit 140 calculates "(E−n)×(T×M)/(E−M)" using the number of documents n, the number of term-applicable documents M for the target term, the number of term-applied documents E, and the term weighted number T, and the value obtained by discarding all digits to the right of the decimal point from the calculation result is taken as a "total count (L)." Note that as a special case, when the value (E) of the number of term-applied documents 344 for the target term is set to "∞" in the important word amplification list 340, the total count L is calculated from "T×M."

Figure 12:
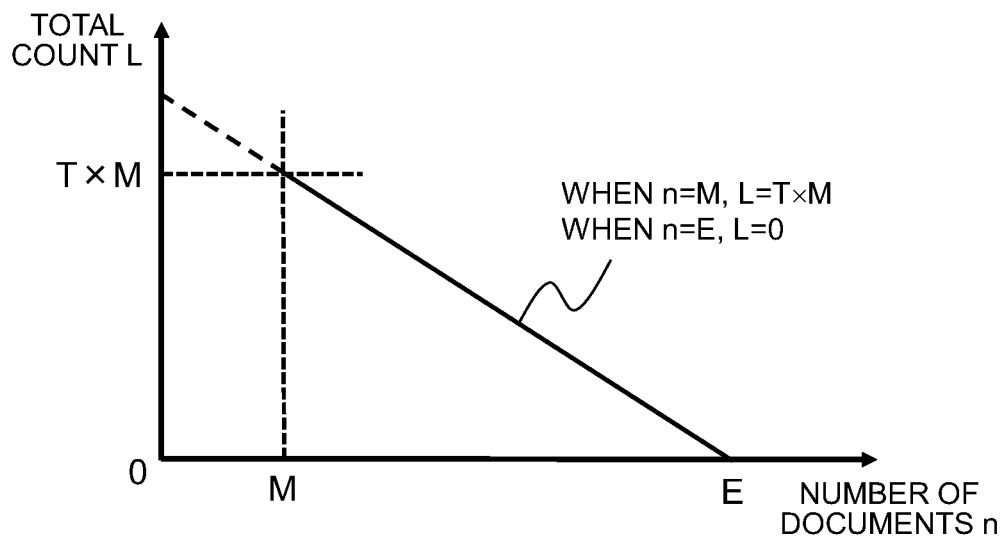
FIG. 12 is a diagram for describing a total count image.

FIG. 12 is a diagram for describing an image of the total count. For a relational expression "L=(E−n)×(T×M)/(E−M)" (where, L is obtained by discarding all digits to the right of the decimal point) used to calculate a total count L in step S204 in FIG. 11, FIG. 12 shows a visualized graph with the number of documents n on the horizontal axis and the total count L on the vertical axis. Note that in FIG. 12, when the number of documents n is equal to or smaller than the number of term-applicable documents M, "YES" is determined at the branch in step S201, the relational expression in step S204 is not applied and therefore L is shown by a broken line.

As shown by a solid line in the graph in FIG. 12, the value of the total count L decreases linearly from "T×M" after the number of documents n exceeds the number of term-applicable documents M, and the value becomes 0 when the number of documents becomes the number of term-applied documents E. The amplification count is determined based on the total count L calculated in this way for the subsequent processes in steps S205 to S209.

Returning to the description of FIG. 11, after the process in step S204 ends, the word amplification unit 140 divides the total count (L) by the number of term-applicable documents (M), and takes the value obtained by discarding all digits to the right of the decimal point from the calculated value as a "standard amplification count." Furthermore, the word amplification unit 140 multiplies the standard amplification count by the number of term-applicable documents M and takes the calculated value as a "scheduled amplification count" (step S205). Note that the above-described "total count," "standard amplification count," and "scheduled amplification count" are variables used to calculate the "amplification count" of the target term.

Next, the word amplification unit 140 provisionally assumes the "amplification count" of the target term as the "standard amplification count" (step S206).

Next, the word amplification unit 140 determines whether or not a relationship of "L−scheduled amplification count≤document number" is established (step S207). Note that the "document number" is a value representing the position of the input document in which the document being processed appears, and, for example, the document number can be obtained based on the history ID 311 of the response history document 310.

In step S207, when the above-described relational expression is established (YES in step S207), the word amplification unit 140 increments the amplification count by "1" (step S208), and then proceeds to step S210. On the other hand, when the above-described relational expression is not established in step S207 (NO in step S207), the flow skips step S208 and proceeds to step S210.

Note that the processes in steps S206 to S208 are an example of processes based on the knowledge that errors can occur when the "amplification count" is calculated by directly using the standard amplification count to adjust the errors. Therefore, the processes may be replaced by other processes that can likewise adjust the errors.

In step S210, the word amplification unit 140 takes the final "amplification count" as a return value and ends the amplification count calculation process associated with the target term.

Note that though not shown in FIG. 11, when an amplification candidate word as a processing target is a word that is not found in the important word amplification list 340 in the amplification count calculation process, the word amplification unit 140 may calculate the amplification count for the word amplification factor (term weighted number T), the number of term-applicable documents M, and the number of term-applied documents E using predetermined standard values.

As described so far, when the amplification count calculation process is executed as shown in FIG. 11 and FIG. 12, the amplification count of the amplification candidate words calculated by the word amplification unit 140 is set to a predetermined value (more specifically, a term weighted number T) until the number of documents n exceeds the number of term-applicable documents M, and the amplification count of the amplification candidate words gradually decreases until the number of documents n exceeds the number of term-applicable documents M and reaches the number of term-applied documents E and becomes 0 when the number of documents n becomes equal to or larger than the number of term-applied documents E.

In the inter-word score calculation process shown in FIG. 10, amplification candidate words are extracted from the terms registered in the term list data 330 provided in advance, the amplification candidate words amplified according to the amplification count calculated in the amplification count calculation process having the aforementioned features are added to the document group (sentences, documents or whole) of the response history document 310, and then, an inter-word score is calculated. That is, the inter-word score calculation apparatus 10 can change the degree of influence by the terms registered in the term list data 330 in calculation of the inter-word score in accordance with a change in the number of documents n inputted to the response history document 310.

Furthermore, in the question & answer extraction system 1, after the inter-word score calculation apparatus 10 calculates an inter-word score and records the calculation result in the inter-word score data 360, the important word extraction unit 170 can extract words existing in easily selectable Q&As based on the combination of words written in the inter-word score data 360 and words included in the selected Q&A data 420 held in the Q&A holding unit 220 of the Q&A extraction apparatus 20 as important words and add the extraction result to the important word amplification list 340.

In the process by the important word extraction unit 170, more specifically, when the user adds selected useful words included in Q&As (selected Q&A data 420) to the important word amplification list 340, and can thereby set the words as amplification targets when calculating the inter-word score. For example, when the words are already registered in the important word amplification list 340, the value (T) of the term weighted number 345 representing its basic amplification count may be increased or the value (E) of the number of term-applied documents 344 may be increased. A change in the above-described value T or value E can not only be made executable by a program that implements the important word extraction unit 170 but also be made executable by the user's specification.

By executing such processes, the question & answer extraction system 1 can feed both the calculation result of the inter-word score and the Q&A selection result by the system user back to the important word amplification list 340 and achieve effects of automatically improving the accuracy in calculation of the inter-word score.

CONCLUSION

As described so far, according to the inter-word score calculation apparatus 10 according to the present embodiment, when the number of documents of past response records (response history document 310) is small (when the number of documents n is equal to or smaller than the number of term-applicable documents M in the present example), it is possible to calculate an inter-word score indicating the degree of relatedness between words included in the response history document 310 by emphasizing the related terms registered in the list of terms (term list data 330).

In the above-described case, when the data amount (the number of documents) is small, the inter-word score calculation apparatus 10 amplifies predetermined words (amplification candidate words) registered in the term list data 330 and also existing in the document, and adds the predetermined words to the document based on the setting of the degree of relatedness between the words (important word amplification list 340). That is, the inter-word score calculation apparatus 10 can prevent words that are unrelated (or weakly related) to the response history document 310 from being selected from the term list data 330 and added to the sentence, and allows only meaningful words in the response history document 310 to be addition candidates. As a result, the inter-word score calculation apparatus 10 can accurately calculate relatedness between words even for the response history document 310 with a small amount of data.

Note that since not only a list in which the system administrator has listed related phrases but also various term lists such as already completed glossaries or manual indexes can be utilized for the term list data 330 without defining inter-word relatedness, the system administrator can easily make additions, changes, and the like the list.

According to the inter-word score calculation apparatus 10 of the present embodiment, when the number of documents of past response records (response history document 310) increases (in the present example, until the number of documents n reaches the number of term-applied documents E beyond the number of term-applicable documents M), it is possible to calculate the inter-word score indicating the degree of relatedness between words included in the response history document 310 while gradually suppressing influences of related terms registered in the list of terms (term list data 330). Furthermore, according to the inter-word score calculation apparatus 10 of the present embodiment, when the number of documents of past response records (response history document 310) increases beyond a predetermined number (in the present example, when the number of documents n becomes equal to or larger than the number of term-applied documents E), it is also possible to calculate the inter-word score by excluding influences of related terms registered in the list of terms (term list data 330). When more response records are accumulated, since the accuracy of relatedness between words that can be determined from the response history document 310 increases, it is possible to make inter-word associations along realistic response records by suppressing influences of the list of terms as described above. As a result, when the input data amount increases relative to an initial state, the inter-word score calculation apparatus 10 according to the present embodiment can solve the problem in the prior art that inter-word association is more likely to be biased to the contents of a list of terms and make highly accurate inter-word associations.

Therefore, even when the number of documents of past response records (response history document 310) is small or increases, the inter-word score calculation apparatus 10 according to the present embodiment can calculate the degree of relatedness between words with high accuracy, appropriately calculate the degree of relatedness between words (inter-word score) included in the data according to a change in the amount of accumulated data (the number of documents) and extract suitable related phrases using this degree of relatedness.

With the inter-word score calculation apparatus 10 according to the present embodiment, the system administrator needs to set control flags in the term list data 330 and the important word amplification list 340 to calculate an inter-word score, but since an existing glossary or the like can be used for the term list data 330 as described above, the effort required for the system administrator can be reduced. For example, even when the term list data 330 is not continuously maintained, if the number of documents accumulated increases, the list of terms is not referenced further, and so the effort of the system administrator is considerably reduced. For example, even when a coverage rate of terms by the term list data 330 is low, the inter-word score calculation apparatus 10 can calculate the degree of relatedness between words on the same level with existing techniques or with the low coverage taken into consideration. The system administrator can adjust parameters of the important word amplification list 340 and thereby adjust the degree of influence of the term list data 330 on the calculation of the inter-word score, which facilitates management.

The inter-word score calculation apparatus 10 according to the present embodiment allows not only words but also terms according to a rule such as a regular expression to be registered as shown in the term list data 330 in FIG. 4 and the important word amplification list 340 in FIG. 5. For this reason, when amplification candidate words are extracted, not only terms in which words completely match but also terms that match a rule can be extracted, and so it is expected to have the effect of expanding the scope of use for calculating inter-word scores.

Equipped with the inter-word score calculation apparatus 10 and the Q&A extraction apparatus 20 having the aforementioned various effects, the question & answer extraction system 1 according to the present embodiment can extract and present a suitable Q&A combination based on a degree of relatedness between words (inter-word score) appropriately calculated in accordance with a change in an amount of data accumulated in response to a Q&A search request by the system user.

Furthermore, the question & answer extraction system 1 according to the present embodiment holds information of Q&A selected by the system user out of the Q&A combination presented in response to a Q&A search request in the Q&A holding unit 220, uses the information of Q&A for the important word extraction unit 170 of the inter-word score calculation apparatus 10 to extract important words, and can thereby feed both the calculation result of the inter-word score and the Q&A selection result by the system user back to the important word amplification list 340 and automatically improve the accuracy in the calculation of the inter-word score.

Note that the present invention is not limited to the above-described embodiment, but various modifications can be included. For example, the above-described embodiment has been described in detail to describe the present invention in an easy-to-understand manner, and is not necessarily limited to the one provided with the whole configuration described above. Some components of the embodiment may be deleted, replaced or other components may be added thereto.

For example, in the embodiment described with reference to FIG. 11 and FIG. 12, when the number of documents n exceeds the number of term-applicable documents M, influence of the list of terms is reduced sequentially (see steps S203 to S208 in FIG. 11), but the influence of the list of terms may be "fixed to a state similar to that when the number of documents n is the number of term-applicable documents M and not changed" or "the amplification count is not reduced and the target document to which the amplification list is added may be distributed (e.g., the number of documents applied is gradually reduced)" as a modification.

For example, in the above-described embodiment, in step S205 in FIG. 11, although the calculation expression of the "total count L/the number of term-applicable documents M" is used to calculate a standard amplification count and the calculation expression of "the standard amplification count× the number of term-applicable documents M" is used to calculate the scheduled amplification count, "the number of documents n" may be used in each calculation expression instead of "the number of term-applicable documents M" as a modification.

The system that extracts Q&As has been described in the above-described embodiment, but the inter-word score calculation apparatus and the method therefor according to the present invention are not limited to use for extracting Q&As and even when the data amount is relatively small, the present invention is applicable to all techniques for calculating relatedness between words.

More specifically, for example, it is assumed that the inter-word score calculation apparatus according to the present invention will be used for a system to search for experts in the research field. As a simple configuration when constructing the system, for example, the inter-word score calculation apparatus 10 accumulates papers as input documents corresponding to the response history document 310, registers a list of names of professors or assistant professors of a university in the term list data 330, and calculates an inter-word score between the names of authors of papers and words included in abstracts. Furthermore, an apparatus that corresponds to the Q&A extraction apparatus 20 is configured to receive the "field name" as a search phrase when searching for experts and use the "author name" having a high inter-word score with respect to the "field name" of the search phrase as a search result. With the expert search system configured as described above, when the number of accumulated papers is relatively small, professors or assistant professors are selected with priority from the search result of experts due to influence of the list of terms, and so, it is possible to provide experts assumed to be reliable despite the small amount of data, as the search result. On the other hand, when the number of papers accumulated increases, the influence of the list of terms reduces and experts other than professors or assistant professors who have written many papers are more likely to be selected at the top, and so, it is possible to provide the search result with high reliability according to the actual data.

Some or all of the above-described components, functions, processing units, processing means or the like may be implemented by hardware, by designing them with, for example, integrated circuits. Alternatively, the components, functions or the like may also be implemented by software by the processor interpreting a program that implements the respective functions and executing the program. Information on the program, tables, files or the like that implement the functions can be stored in a recording apparatus such as a memory, a hard disk, an SSD (solid state drive) or a recording medium such as an IC card, an SD card or a DVD.

In the drawings, control lines and information lines indicate what is considered necessary for description, and not all control lines and information lines are shown on the product. In reality, almost all components may be considered to be interconnected.

REFERENCE SIGNS LIST 1 question & answer extraction system
10 inter-word score calculation apparatus
20 Q&A extraction apparatus
30 response history input person's terminal
40 system administrator's terminal
50 system user's terminal
60 information processing apparatus
61 input apparatus
62 output apparatus
63 memory
64 storage apparatus
65 CPU
66 I/F
67 bus
110 response history holding unit
120 in-document word extraction unit
130 amplification candidate word extraction unit
140 word amplification unit
150 word combination unit
160 inter-word score calculation unit
170 important word extraction unit
180 data holding unit
210 Q&A extraction unit
220 Q&A holding unit
310 response history document
320 word dictionary data
330 term list data
340 important word amplification list
350 combination method list data
360 inter-word score data
410 generated Q&A data
420 selected Q&A data

What is claimed is:

1. An inter-word score calculation apparatus that calculates a degree of relatedness between words included in document data in which one or more documents are accumulated, the inter-word score calculation apparatus comprising:
    an input device that accumulates the one or more documents;
    a memory that stores the one or more documents in the document data and term list data in which predetermined terms are written; and
    a processor configured to:
        perform a combination process of amplifying an amplification candidate word, which is a word corresponding to a term written in the term list data and included in the one or more documents constituting the document data, creating an amplified word, and adding the amplified word to the document data creating processed document data,
        calculate the degree of relatedness between words included in the processed document data using a predetermined calculation method, and
        when an amount of documents accumulated in the document data is smaller than a first predetermined amount, add the amplification candidate word to the processed document data.

2. The inter-word score calculation apparatus according to claim 1, wherein when the amount of documents accumulated in the document data is equal to or larger than the first predetermined amount, the processor suppresses a degree of addition of the amplification candidate word to the processed document data compared to a case where the amount of documents accumulated in the document data is smaller than the first predetermined amount.

3. The inter-word score calculation apparatus according to claim 2, wherein the processor gradually suppresses the degree of addition of the amplification candidate word to the processed document data as the amount of documents accumulated in the document data approaches the first predetermined amount.

4. The inter-word score calculation apparatus according to claim 1, wherein
the memory further stores an important word amplification list that specifies a setting of amplification for each term written in the term list data, and
the processor is further configured to:
determine an amplification count for each amplification candidate word based on the amount of documents accumulated in the document data and the important word amplification list,
create an amplification list in which the amplification candidate word is amplified by the determined amplification count as the amplified word, and
combine the amplification list with the document data.

5. The inter-word score calculation apparatus according to claim 4, wherein when the amount of documents accumulated in the document data is equal to or larger than the first predetermined amount, the processor maintains the amplification count as constant for each amplification candidate word.

6. The inter-word score calculation apparatus according to claim 4, wherein until the amount of documents accumulated in the document data exceeds a second predetermined amount and reaches the first predetermined amount, the processor gradually suppresses the amplification count for each amplification candidate word.

7. The inter-word score calculation apparatus according to claim 6, wherein when the amount of documents accumulated in the document data is equal to or smaller than the second predetermined amount, the processor sets the amplification count for each amplification candidate word to a predetermined count specified in the important word amplification list.

8. The inter-word score calculation apparatus according to claim 4, wherein, based on a predetermined combination method, the processor adds the amplification list for at least one of:
all of the one or more documents in the document data,
the one or more documents containing the amplification candidate word, or
a sentence containing the amplification candidate word.

9. The inter-word score calculation apparatus according to claim 4, wherein
the input device receives an important word selected by a user, and
the processor is further configured to
add the important word to the important word amplification list,
change the setting of amplification in the important word amplification list so as to increase the amplification count of the important word when the important word is selected as the amplification candidate word,
receive, from the input device, a sentence selected by the user that is included in the document data and that includes the important word, and
calculate the degree of relatedness between the important word and other words in the sentence.

10. The inter-word score calculation apparatus according to claim 1, wherein each term written in the term list data is a word or a predetermined rule expression.

11. A question & answer (Q&A) extraction system that extracts a combination of a question sentence and an answer sentence from document data in which one or more documents are accumulated, the Q&A extraction system comprising:
an inter-word score calculation apparatus that calculates a degree of relatedness between words included in the document data; and
a Q&A extraction apparatus that extracts a combination of the question sentence and the answer sentence, which is a combination of words with a high degree of relatedness from the one or more documents included in the document data using the degree of relatedness calculated by the inter-word score calculation apparatus,
wherein the inter-word score calculation apparatus comprises:
an input device that accumulates the one or more documents including the question sentence and the answer sentence,
a memory that stores the one or more documents in the document data and term list data in which predetermined terms are written, and
a processor configured to:
perform a combination process of amplifying an amplification candidate word, which is a word corresponding to a term written in the term list data and included in the one or more documents constituting the document data, creating an amplified word, and adding the amplified word to the document data creating processed document data,
calculate the degree of relatedness between words included in the processed document data using a predetermined calculation method, and
when an amount of documents accumulated in the document data is smaller than a first predetermined amount, add the amplification candidate word to the processed document data.

12. An inter-word score calculation method using an inter-word score calculation apparatus that calculates a degree of relatedness between words included in document data in which one or more documents are accumulated, the inter-word score calculation method comprising:
receiving the one or more documents;
storing the one or more documents in the document data and term list data in which predetermined terms are written;
performing a combination process of amplifying an amplification candidate word, which is a word corresponding to a term written in the term list data and included in the one or more documents constituting the document data, creating an amplified word, and adding the amplified word to the document data creating processed document data;
calculating the degree of relatedness between words included in the processed document data using a predetermined calculation method; and
when an amount of documents accumulated in the document data is smaller than a first predetermined amount, adding the amplification candidate word to the processed document data.

* * * * *